United States Patent [19]

Vaughn

[11] Patent Number: 4,710,035
[45] Date of Patent: Dec. 1, 1987

[54] INHERENT VARIABLE FLUID RESTRICTOR

[75] Inventor: Mark R. Vaughn, Albuquerque, N. Mex.

[73] Assignee: Board of Regents, The University of Texas System, Austin, Tex.

[21] Appl. No.: 874,859

[22] Filed: Jun. 16, 1986

[51] Int. Cl.$^4$ .............................................. F16C 17/02
[52] U.S. Cl. ...................................... 384/115; 384/118
[58] Field of Search ...................... 384/12, 13, 26, 99, 384/100, 114, 115, 118, 107, 111, 113, 322, 372, 373, 380, 397, 398

[56] References Cited

U.S. PATENT DOCUMENTS

| 3,711,167 | 1/1973 | Ennis | 308/5 R |
| 3,754,799 | 8/1973 | Hedberg | 308/5 R |
| 3,761,146 | 9/1973 | Unno et al. | 308/9 |
| 3,903,993 | 9/1975 | Vorrhees et al. | 384/12 X |
| 3,945,692 | 3/1976 | Tsujiuchi | 308/9 |
| 3,998,502 | 12/1976 | Walter et al. | 308/9 |
| 4,371,216 | 2/1983 | Suzuki et al. | 384/118 |
| 4,457,566 | 7/1984 | Mohsin | 308/5 R |
| 4,474,483 | 1/1964 | Suzuki et al. | 384/114 |

FOREIGN PATENT DOCUMENTS 603787 4/1978 U.S.S.R. ............................. 384/100

Primary Examiner—Stuart S. Levy
Assistant Examiner—David Werner
Attorney, Agent, or Firm—Arnold, White & Durkee

[57] ABSTRACT

The invention disclosed herein relates to an inherent variable fluid restrictor for regulating fluid pressure in a hydrostatic bearing. The inherent variable fluid restrictor is comprised of a restrictor land surrounding a fluid supply port, a collection gallery around the restrictor land and containing a fluid cross-feed port, an isolation land around the collection gallery, and a bearing pocket around the isolation land. A flow channel connects the fluid cross-feed port to a diametrically opposed bearing pocket.

8 Claims, 4 Drawing Figures

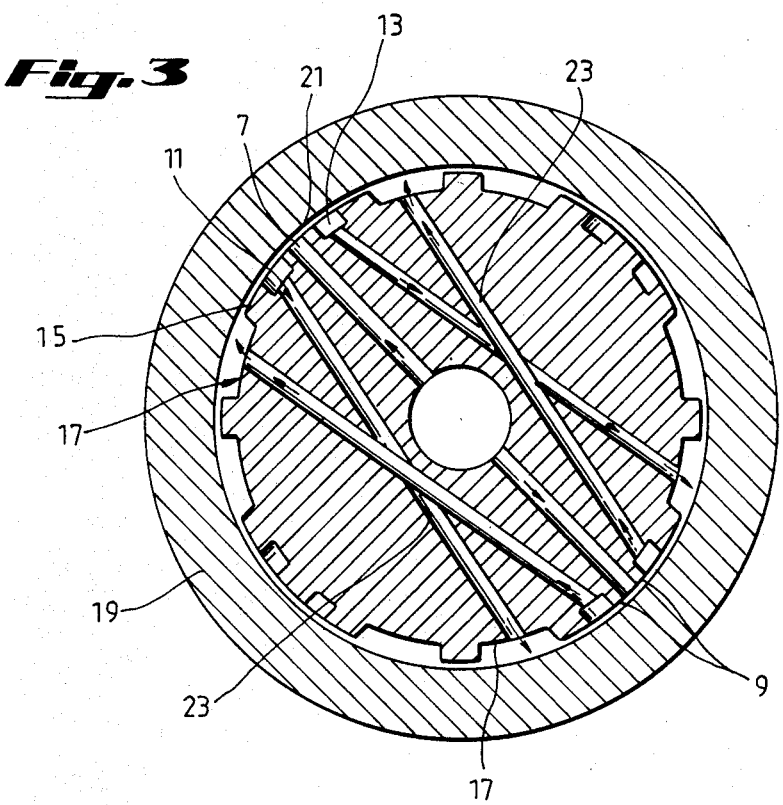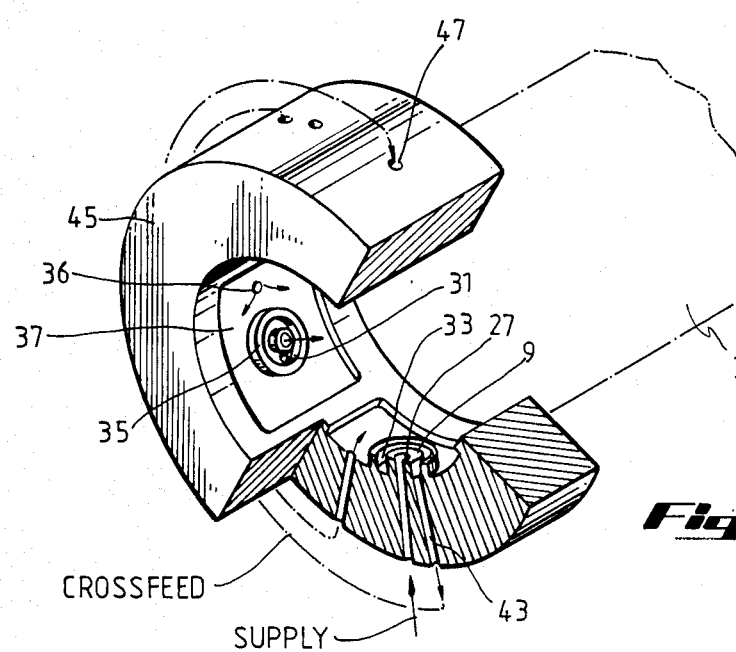

INHERENT VARIABLE FLUID RESTRICTOR

BACKGROUND OF THE INVENTION

1. Field of the Invention

The present invention relates to a fluid restrictor in a hydrostatic bearing.

2. Description of the Prior Art

Hydrostatic bearings are fluid film bearings used in applications where high static stiffness, high static load capacity, and low viscous drag are desired. Hydrostatic bearings derive their load capacity from externally pressurized fluid lubricant. The stiffness of a hydrostatic bearing depends heavily upon the type of fluid restrictor used.

A typical bearing comprises two members, one of which moves in or on the other. The inner member is generally a shaft, or the like; the outer member may be a body member, bushing, sleeve, block or the like.

In conventional hydrostatic bearings, a bearing surface is provided with a plurality of pockets which are surrounded by a plurality of lands divided by discharge grooves. Pressurized fluid is supplied to these pockets through fixed orifice restrictors. The stiffness of orifice compensated hydrostatic bearings is greatly affected by clearance and fluid viscosity variations. Clearance variations are the natural result of a load being applied to the object which the bearing supports.

Other types of hydrostatic bearings utilize fixed laminar restrictors such as slot flow devices or capillary tubes to control stiffness. Such bearings are less stiff than the orifice compensated variety; however, their stiffness is greatly affected by clearance variations between the bearing and the object which it supports.

In an attempt to solve the difficulties resulting from the effects of clearance variations upon stiffness, numerus hydrostatic bearings have been developed which employ flow control valves to regulate flow in response to clearance variations. The performance of these flow control valves has been adversely affected by sticking, component inertia, and fluid viscosity variations.

At least one hydrostatic bearing has been developed utilizing an inherent variable fluid restrictor to regulate stiffness. Such an arrangement is disclosed in U.S. Pat. No. 3,754,799, dated Aug. 28, 1973, hereinafter referred to as the '799 patent. The fluid restrictor is located external to the bearing pocket in the '799 patent. In the common situation where the object supported by the bearing is tilted, the clearance variation is a function of axial position along the hydrostatic bearing. In this situation, the fluid restrictor and the bearing pocket will be exposed to different clearance variations. The inherent variation in flow through the fluid restrictor in response to a tilt load will not be appropriate for the clearance variation existing at the bearing pocket. The hydrostatic bearing disclosed in the '799 patent will not stabilize an object subjected to a tilt load.

SUMMARY OF THE INVENTION

The present inherent variable fluid restrictor provides a means of controlling hydrostatic bearing stiffness, independent of clearance and fluid viscosity variations. The location of the fluid restrictor, within the bearing pocket, provides inherenty stable performance, under both load induced and expansion induced, clearance variations.

According to this invention, fluid is supplied to the restrictor through a fluid supply hole or port. The fluid flows over a restrictor land surrounding the fluid supply port. The fluid is collected in a collection gallery around the restrictor land and containing a fluid cross-feed port. An isolation land located around the collection gallery, inhibits the flow of fluid into the surrounding bearing pocket. The fluid in the collection gallery flows through the fluid cross-feed port, through a channel, and into a diametrically opposed bearing pocket. The interconnection of diametrically opposed pockets allows a hydrostatic bearing using inherent variable fluid restrictors to return to a stable equilibrium position in response to a clearance variation. The location of the inherent variable fluid restrictor, anywhere inside the bearing pocket, enables a hydrostatic bearing of this design to stabilize an object subjected to a tilt load.

BRIEF DESCRIPTION OF THE DRAWINGS

FIG. 3 is a cross-sectional view taken along the line I—I of FIG. 1.

FIG. 4 is a perspective view of the invention applied to a sleeve-type hydrostatic bearing.

DETAILED DESCRIPTION OF THE PREFERRED EMBODIMENTS

Figure 1:
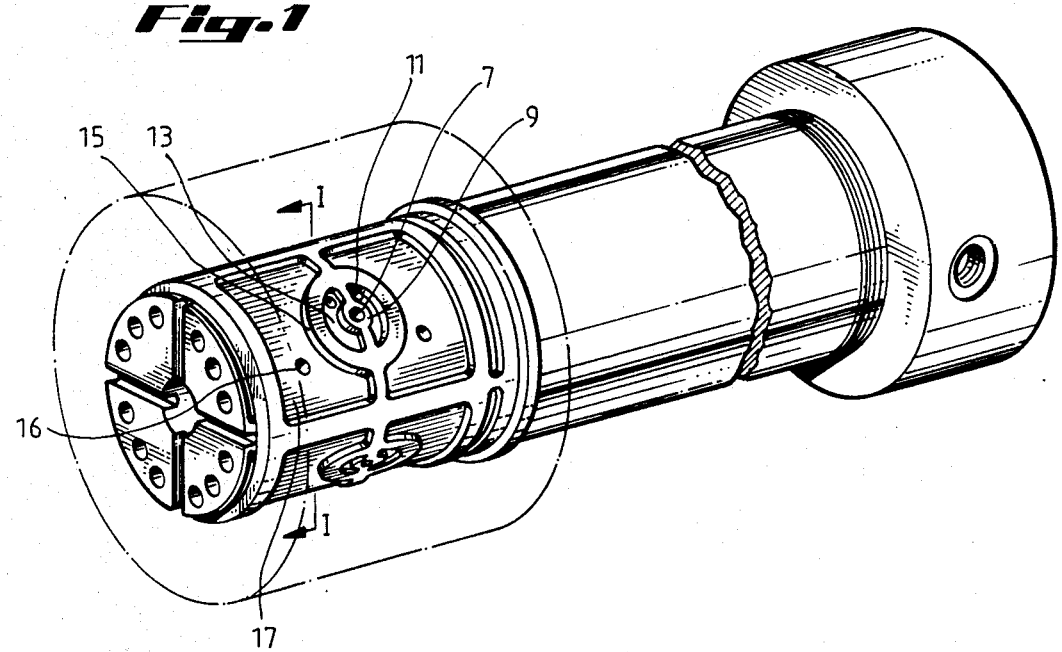
FIG. 1 is a perspective view of the invention applied to a shaft-type hydrostatic bearing.
Figure 2:
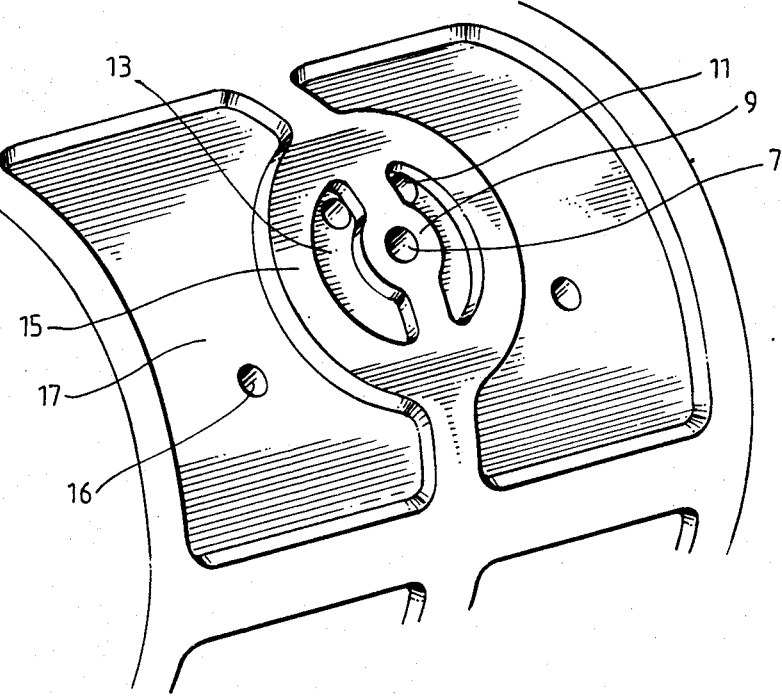
FIG. 2 is a close-up view of the restrictor embodiment depicted in FIG. 1.

Referring to FIGS. 1 and 2, fluid flows out of fluid supply port 7, and over the surrounding restrictor land 9. After passing over restrictor land 9, the fluid is collected in collection gallery 13, located around the restrictor land 9, from which it flows into fluid cross-feed port 11, located in collection gallery 13. Isolation and 15, located around collection gallery 13, inhibits the flow of fluid into surrounding bearing pocket 17. In a preferred embodiment, isolation land 15 is at least 1.5 times as wide as restrictor land 9.

Referring now to FIG. 3, the fluid flow path is depicted from a cross-sectional view. Fluid flowing out of supply port 7 and across restrictor and 9 passes through the clearance gap 21 which separates the object 19 supported by the bearing, and the restrictor land 9. The fluid enters fluid cross-feed port 11 and flows through interconnection channel 23 into a diametrically opposed bearing pocket 17. FIG. 3 is a simplified cross-sectional view of a shaft-type hydrostatic bearing, which only shows the cross-feed interconnection channels 23 between two diametrically opposed pockets for the sake of illustrative simplicity. In actuality, a multiplicity of diametrically opposed pockets are located on the bearing shaft, with each pair of diametrically opposed pockets being interconnected by flow channels 23 as depicted in FIG. 3.

Referring now to FIG. 4, another preferred embodiment of the invention is depicted in a sleeve-type bearing application. In this application, the object 39 supported by the bearing 45 is typically a rotating shaft. The fluid flows out of supply port 27, across the surrounding restrictor land 29, and into fluid cross-feed port 31, located in surrounding collection gallery 33. The fluid flows through cross-feed channel 43, around the exterior of the bearing sleeve, and into a bearing pocket supply channel 47. After passing through bearing pocket supply channel 47, the fluid enters diametrically opposed bearing pocket 37, through bearing pocket supply port 36. Bearing pocket 37 is located around isolation land 35, which is located around collection gallery 33, wherein fluid cross-feed port 31 is contained.

Many modifications and variations may be made in the embodiments described herein and depicted in the accompanying drawings without departing from the concept of the present invention. Accordingly, it is clearly understood that the embodiments described and illustrated herein are illustrative only and are not intended as limitations upon the scope of the present invention.

What is claimed is:

1. A hydrostatic bearing having diametrically opposed surfaces comprising:
   a first bearing surface;
   a fluid supply port located in said bearing surface;
   a restrictor land on said surface surrounding said fluid supply port in said first bearing surface;
   a collection gallery in said first bearing surface around said restrictor land and containing a fluid cross-feed port;
   an isolation land around said collection gallery; and
   a first bearing pocket around said isolation land.

2. The hydrostatic bearing member of claim 1, further comprising:
   a second bearing surface diametrically opposed to said first bearing surface;
   a second bearing pocket located in said second bearing surface; and
   a flow channel connecting said fluid cross-feed port to said second bearing pocket.

3. The hydrostatic bearing member of claim 1, wherein said isolation land is at least 1.5 times as wide as said restrictor land.

4. A hydrostatic bearing comprising:
   a hollow body member defining a sleeve-like member;
   a shaft member journalled in said sleeve-like member; said members having opposed bearing surfaces;
   a plurality of bearing pockets distributed around one of said surfaces in diametrically opposed pairs;
   a separate inlet port in each said pocket adapted to supply fluid lubricant to said pocket;
   a separate restrictor land around each said inlet port;
   a separate isolation land around and spaced from each said restrictor land to define a collection gallery beween said lands, said isolation land also isolating said collection gallery from the remaining portion of its respective pocket; and
   a separate outlet port in each said gallery configured to convey fluid lubricant from its respective gallery to said remaining portion of the pocket diametrically opposite the bearing pocket of said outlet port.

5. The bearing of claim 1 in which said bearing pockets are in the bearing surface of said body member.

6. The bearing of claim 1 in which said bearing pockets are in the bearing surface of said shaft member.

7. The bearing of claim 4, 5, or 6 are in which said sleeve-like menber and said shaft member are cylindrical.

8. A hydrostatic bearing member having diametrically opposed surfaces comprising:
   a first bearing surface;
   a fluid supply port in said first bearing surface;
   a restrictor land surrounding said fluid supply port;
   a collection gallery around said restrictor land;
   an isolation land around said collection gallery;
   a first bearing pocket around said isolation land;
   a second bearing surface diametrically opposed to said first bearing surface;
   a second bearing pocket in said second bearing surface; and
   a flow channel connecting said collection gallery to said second bearing pocket.

* * * * *

UNITED STATES PATENT AND TRADEMARK OFFICE
CERTIFICATE OF CORRECTION

PATENT NO. : 4,710,035

DATED : December 1, 1987

INVENTOR(S) : Mark R. Vaughn

It is certified that error appears in the above-identified patent and that said Letters Patent is hereby corrected as shown below:

Column 2, line 35, "and" should read -- land --.

Column 2, line 42, "and" in the second instance should read -- land --.

Signed and Sealed this

Tenth Day of May, 1988

*Attest:*

DONALD J. QUIGG

*Attesting Officer*  *Commissioner of Patents and Trademarks*